Patented Oct. 25, 1949

2,485,566

UNITED STATES PATENT OFFICE 2,485,566

METHOD AND DEVICE FOR INDICATING SPOILAGE

James d'A. Clark, United States Army, River Forest, Ill.

No Drawing. Application September 24, 1945, Serial No. 618,391

10 Claims. (Cl. 99—192)

(Granted under the act of March 3, 1883, as amended April 30, 1928; 370 O. G. 757)

The invention described herein, if patented may be manufactured and used by or for the Government for governmental purposes, without the payment to me of any royalty thereon.

This invention relates to a method and device for indicating spoilage, and more particularly to a method and device for the visual indication of possible bacterial spoilage of materials which are subject to such spoilage during storage.

With the growing practice of the use of freezing as a means for preserving perishable foodstuffs and biological preparations and effecting their distribution in small packages, and with the advent of similar practices with precooked foodstuffs, especially with those containing starchy or other carbohydrate components in the form of a paste or sauce, there is danger of improper storage or transit conditions resulting in the development of toxic bacteria in the food or product to a point where its consumption would result in serious consequences. Even though it is not usually possible to ensure complete sterilization of a perishable product, if the product is wholesome at the time of packaging and thereafter maintained in a frozen or near frozen state until just before use, there is no danger of the development of any toxic bacteria present to any harmful extent. On the other hand, if a package were defrosted for a sufficient period during storage or distribution, for example, if the freezing equipment were to fail temporarily, or if there were an undue waiting period during transshipment, the package in the frozen state would, in general, show no clear evidence of its having been temporarily warmed up and then refrozen, which may have resulted in its being dangerously contaminated with bacteria or their toxins. Furthermore, with the growing practice of placing small quantities of perishable products such as fresh fish, meats and vegetables in individual or small packages for distribution, the presence of the covering material and other factors make it difficult for the purchaser to decide upon the state of freshness of those products.

One of the objects of the invention is to provide a simple sure method whereby the recipient of a package of a perishable product such as some foodstuffs, biological preparations or the like, can be assured that upon receipt, such product has not been subjected to conditions that would have stimulated the growth of bacteria present in the product at the time of packaging for a long enough period to be harmful, or to conditions that have resulted in a substantial deterioration of the product.

It is a further object of this invention to provide for a method of indicating spoilage due to bacterial growth or enzymatic action in a package by inserting in the package an indicator which exhibits an irreversible change in visual appearance upon an appreciable multiplication of bacteria in the indicator.

Another object of the invention is to provide a simple visual device for indicating whether or not during storage a package of a perishable product has been subjected to conditions which may have stimulated the growth of bacteria in the product for a long enough period to be harmful or other appreciable deterioration.

It is another object of this invention to provide an indicating device for inclusion in a packaged product and having a nutrient inoculated with bacteria having the property of presenting a visual indication when unduly multiplied.

A further object of this invention is to provide an indicating device having a nutrient inoculated with bacteria and a dye which changes its color under the influence of a substantial multiplication of bacteria.

Other objects and advantages of the present invention will appear in the following detailed description and be particularly pointed out in the appended claims.

The objectives are attained by including anywhere in the package, or container, preferably visible from the outside, an indicator which contains a material inoculated with harmless bacteria which results in a permanent color or permanent change of color or other visible change when the package has been subjected to conditions favorable to a substantial multiplication of any toxic or other undesirable bacteria that may be present in the packaged product or favorable to a substantial degree of enzymatic or chemical action in the product.

An indicator system adapted to accomplish the indication of harmful bacterial processes inside a food package may consist of a transparent cell associated with the package, in which a bacterial process analogous to that occurring inside the package is visually observable. Such visual observation is afforded, for instance, by the response of a pH-change-responsive indicator to bacterial or enzymatic change of the pH produced by a strain of bacteria, inside the cell, which is activated by the same temperature conditions which bring about the harmful process inside the food package. Thus a bacterial or enzymatic process inside the package is reproduced in a bacterial or enzymatic process visible from the outside of the package. The property of bacteria to produce enzymes is well known, and such enzymatic action is visually indicated as a result of the change of the pH of the indicator.

For example, the indicator may consist of a small area of a suitable paper which has been dyed or impregnated with a neutral or weakly alkaline solution of a suitable pH indicator such as brom cresol green. The dyed paper is then coated or saturated with a nutrient culture medium such as prepared agar rendered slightly alkaline and freshly inoculated with a suitable non-toxic, cold resistant, acid-forming bacteria such as one of the lactobacilli or acetobacilli, and if desired, covered with a film of cellophane. The indicator is placed in the package or container of the product, preferably where it can be seen, and the ensemble (package and contents) is chilled or frozen for storage. If after placing the indicator in the package, the temperature of the package becomes sufficiently high for a long enough time, the bacteria in the indicator will multiply sufficiently to produce enough lactic or acetic acid to transform the color of the indicator dye used from its alkaline color to its acid color (deep blue to bright yellow in the case of brom cresol green). The strain of bacteria used and the quantity of alkali or buffering salt employed in the nutrient, are adjusted so that the time for the development of the acid color corresponds with the minimum time-temperature conditions for undesirable development of any toxic bacteria in the packaged product. In general, it will not be necessary to use a buffering salt in the indicator for food products because the development of the indicating bacteria will be about the same as toxic bacteria in food. The use of a buffering salt would only be desirable for special purposes in which an extended time-temperature relationship is wished to be indicated, for example, the loss of freshness or the initial spoilage of some packaged food product like fish caused mainly by enzymatic action. Satisfactory results were obtained with an indicator of the acid-alkali type prepared as follows: One hundred cc. of a nutrient agar solution containing 3 grams of beef extract, 5 grams of peptone and 15 grams of agar per liter was adjusted to a pH of between 8.0 and 8.5 with sodium hydroxide, cooled to between 35° and 40° C. and 1 cc. of a 24 hour beef peptone broth culture of *Escherichia coli* (a non-pathogenic organism) added. Blotting paper was saturated in a solution of one hundredth normal sodium hydroxide containing 0.2 percent of brom thymol blue and the excess solution squeezed off. The blotting paper was then coated with the warm agar culture, and the excess removed by lightly scraping. Placing a piece of this indicator inside the cellophane wrapper or equivalent transparent cover of a three ounce package of frozen food and exposing the package to room temperature, the indicator assumed a decidedly yellow color in approximately 10 hours.

As a further example of another type of indicator for inclusion in the package which is more simply made, a piece of white absorbent paper is impregnated with a nutrient medium inoculated with a suitable chromogenic bacteria. If the package is then exposed to conditions suitable for bacterial growth, the originally white indicator changes its appearance. On the other hand, if the package is kept at freezing temperatures, the indicator will remain white. Satisfactory results were obtained with an indicator of the chromogenic type prepared as follows: One hundred cc. of a nutrient agar solution containing 3 grams of beef extract, 5 grams of peptone, and 15 grams of agar per liter was cooled to between 35° and 40° C. and inoculated with 1 cc. of a 24-hour beef peptone broth culture of *Serratia marcescens* (a non-pathogenic organism). Dry blotting paper was saturated with the warm agar culture and the excess removed by squeezing. Placing a piece of this indicator inside the cellophane wrapper of a three ounce package of frozen food and exposing the package to room temperature, the indicator assumed a vivid scarlet color in approximately 10 hours. The indicator in similarly prepared packages stored at 0° C. for two months, remained white and showed no trace of reddening.

It will be obvious that the principle disclosed for this type of indicator will include the use of any bacteria causing a chemical or physical change that will affect the appearance of the indicator when exposed to conditions favorable for bacteria in the product to multiply to an undesirable extent. The principle is not limited to the application of an inoculated film on a suitable indicator surface, but includes the use of a capsule, cellophane envelope, or other small cell containing an inoculated medium which will register the prior occurrence of favorable growth conditions by the visible formation of gas, change of color or transparency, or other readily noticeable physical change.

The indicating device and method of this invention are particularly applicable to packages or containers of frozen foodstuffs and biological preparations although the principle can be applied to any situation where it is desirable to have an indication of excessive bacterial growth or chemical or enzymatic deterioration. The indicator with its bacteria culture is inserted in or placed contiguous to the package or container so as to be under the same time-temperature conditions as the product and where the conditions are such as to favor an appreciable increase of bacteria in the product which would contaminate the product or to cause other deterioration, there would also be an appreciable increase of the bacteria in the indicator to produce an irreversible change in the indicator and thus give a danger signal to the ultimate recipient.

In applying the method and device of this invention to frozen product packages, the indicator is preferably produced and inserted in the package immediately prior to or just after freezing. If at anytime thereafter until final use, defrosting occurs during storage or transit and the temperature rises sufficiently high and for a sufficient period of time to cause bacterial spoilage of the product, the indicator will register this condition and even though the product is again frozen and may appear to be in satisfactory condition, the indicator will still present the fact that the dangerous condition had occurred and that the product is spoiled and should not be used.

In a very limited number of applications it would be practical to include in the frozen package a visual moisture recording device which would register the fact that defrosting and possible bacterial spoilage had occurred by the action of liquid water on it. For example, the device may consist of a small closed porous envelope containing particles of a soluble dyestuff placed next to the packaged material after it has been frozen initially. As long as the material remains frozen, no liquid is available to come in contact with the dye but if the material does thaw, liquid will penetrate the envelope, dissolve the particles of the dye, and cause a staining of the exterior of the envelope. Depending on the resistance of the envelope to liquid penetration, which may be varied by employing envelopes of varying degrees of thickness or porosity, the rate at which staining occurs after thawing, may be controlled so that no staining will be evident until a period of time has elapsed, for example six hours. This time may correspond to a reasonably safe period during which bacteria present in the packaged material could not have multiplied to a dangerous extent. The moisture indicating device could be constructed in other ways, for example, water soluble dye marks could be imprinted on a piece of paper, or powdered dye could be sandwiched between strips of paper, or part of the wrapper for the frozen product could be so treated as to provide visual evidence of having been in contact with liquid derived from a defrosted product. The thawing indicator will not work as well as the bacteria-type indicator to indicate bacterial spoilage since the thawing indicator will also change in appearance when the contents are held just above freezing for some hours at a temperature sufficiently low to preclude the development of any bacteria present in the product. Thus the thawing indicator may indicate spoilage of the product when actual spoilage had not occurred.

Another type of indicator that could be used in frozen packages is one of the well known maximum temperature recording devices. However, such device is not simple and would not work as well as the bacteria-type indicator, for unless the maximum temperature recording device recorded both the time and the temperature, a momentary warming of the package or device to the recorded temperature, which would not cause any appreciable bacterial growth, would result in a misleading indication of danger.

Another type of indicator that could be used is a time-temperature recording device. This is not a simple instrument and obviously could be employed only with very large containers. Furthermore, it would not give a simple visual indication of previous conditions favorable to spoilage, because the temperature greatly influences the rate of multiplication of bacteria or enzymatic action in other than a direct relationship and the time-temperature effects would require skill in their interpretation.

It will be understood that reference to the action of bacteria, in the specification and claims, refers also to enzymatic action which is commonly believed to be the actual causative agent in bacterial action; thus, acid-producing, oxidizing, or otherwise-active enzymes could be substituted for the bacteria or bacterial action disclosed.

While the invention has been described in more or less detail, it is not to be limited thereby, as changes may be made in the procedure, form, arrangement and construction of parts, and equivalents may be substituted, without departing from the spirit and the scope of the invention as defined in the appended claims, the forms hereinbefore described being merely preferred embodiments thereof.

I claim:

1. The method of indicating that a product has been under temperature conditions favoring an appreciable increase of bacteria in or resulting in an appreciable deterioration of such product, comprising placing adjacent to the product a sealed transparent cover containing cold-resistant substantially non-pathogenic bacteria and a simple visual indicator responsive to pH change, which indicator assumes a marked change in appearance to the unaided eye after the ensemble has been subjected to such temperature conditions.

2. A method of indicating spoilage due to bacterial or enzymatic action in a packaged product, comprising the steps of inoculating a culture medium with cold-resistant substantially non-pathogenic acid-producing bacteria, applying said inoculated medium to an acid-responsive indicator in a sealed transparent cover adjacent the product, whereby a substantial multiplication of bacteria will change the appearance of said indicator after the ensemble has been subjected to temperature conditions favoring such bacterial multiplication.

3. An indicating device capable of association with a packaged product, comprising a sealed transparent cell containing a pH-change-responsive alkaline coloring agent and an acid-forming cold-resistant substantially non-pathogenic bacteria culture in close association with said coloring agent, whereby when temperature conditions favor the multiplication of bacteria, said coloring agent will change in color.

4. In a package for a product susceptible to bacterially or enzymatically caused deterioration under temperature conditions favoring such bacterial or enzymatic actions, an indicator for registering the occurrence of conditions favoring the multiplication of bacteria or occurrence of enzymatic action in said product, said indicating device comprising a sealed transparent cover associated with said package, said cover containing a nutrient medium and a culture of cold-resistant substantially non-pathogenic bacteria in said medium whereby when such temperature conditions occur, a color change will occur in said cover due to the multiplication of said substantially non-pathogenic bacteria.

5. In a package for a product susceptible to bacterially or enzymatically caused deterioration under temperature conditions favoring such bacterial or enzymatic actions, an indicator for registering the occurrence of conditions favoring the multiplication of bacteria or occurrence of enzymatic action in said product, said indicating device comprising a sealed transparent cover associated with said package, said cover containing a nutrient medium and a pH-change-responsive coloring agent to color said medium, and a cold-resistant substantially non-pathogenic bacteria inoculation in said medium whereby when temperature conditions in said packaged product favor the multiplication of bacteria or enzymatic action, said substantially non-pathogenic bacteria will multiply to change the color of said coloring agent.

6. In a package for a product susceptible to bacterially or enzymatically caused deterioration under temperature conditions favoring such bacterial or enzymatic actions, an indicator for registering the occurrence of conditions favoring the multiplication of bacteria or occurrence of enzymatic action in said product, said indicating device comprising a sealed transparent cover associated with said package, said cover containing a nutrient medium and chromogenic cold-resistant substantially non-pathogenic bacteria having the property of changing upon multiplication under such temperature conditions the color of said indicating device.

7. An indicator capable of associating with a packaged product subject to bacterially or enzymatically caused deterioration under conditions favoring bacterial or enzymatic action in that product, comprising a transparent cell, said cell containing a nutrient medium, cold-resistant substantially non-pathogenic bacteria and a pH-change-responsive indicator, whereby when temperature conditions favor the multiplication of bacteria, said substantially non-pathogenic bacteria will multiply and change the color of said indicator.

8. A package for a product susceptible to bacterially or enzymatically caused deterioration under temperature conditions favoring bacterial or enzymatic action, said package comprising an outer covering for said product and an indicator adjacent said outer covering, said indicator comprising a transparent sealed cell carrying a nutrient medium inoculated with cold-resistant substantially non-pathogenic bacteria, said bacteria being adapted upon substantial multiplication under such temperature conditions to cause a color change in said cell.

9. A package as claimed in claim 8, wherein said cell also contains a pH-change-responsive coloring agent which is changed in color when said cold-resistant substantially non-pathogenic bacteria multiply.

10. A package for a product susceptible to bacterially or enzymatically caused deterioration under temperature conditions favoring bacterial or enzymatic action, said package comprising an outer covering for said product and an indicator adjacent said outer covering, said indicator comprising a transparent sealed cell associated with said package, said cell containing a nutrient medium and an inoculation of cold-resistant substantially non-pathogenic bacteria, said bacteria having the property of presenting a color indication when exposed to said temperature conditions favoring bacterial or enzymatic action.

JAMES D'A. CLARK.

REFERENCES CITED

The following references are of record in the file of this patent:

UNITED STATES PATENTS

| Number | Name | Date |
| --- | --- | --- |
| 2,195,395 | Chapman | Apr. 2, 1940 |
| 2,277,278 | Triplett | Mar. 24, 1942 |

OTHER REFERENCES

Buchanan: Bacteriology, MacMillan Co., N. Y. C., 4th ed., 1938, pages 144 and 145.